United States Patent Office 3,362,829
Patented Jan. 9, 1968

3,362,829
COATED DRY GLUTEN PRODUCTS AND
PROCESS FOR PREPARING SAME
Bert W. Landfried, Independence, Mo., and John R. Moneymaker, Overland Park, Kans., assignors to Top-Scor Products, Inc., Kansas City, Kans., a corporation of New York
No Drawing. Filed Oct. 26, 1964, Ser. No. 407,282
12 Claims. (Cl. 99—14)

ABSTRACT OF THE DISCLOSURE

Powdered vital wheat gluten is coated with a non-ionic hydrophilic lipid selected from the class consisting of monoglycerides, salts of lactylic esters of fatty acids, polyoxyethylene stearate, and stearyl monoglyceridyl citrate whereby the gluten particles are characterized by stability against particle cohesion in neutral aqueous dispersion. A minor portion of a highly dispersible surface active agent may be included in the coating material.

This invention relates to proteinaceous products and treating methods therefor, and more particularly to the production of undenatured powdered wheat gluten which is characterized by its ability to remain dispersed in neutral aqueous media for extended periods of time although hydrated and its improved functionality in food products.

The ability of the endosperm proteins of wheat to form a cohesive, viscous, elastic substance commonly referred to as wheat gluten is known. Wheat gluten is heterogeneous in character and consists of several component proteins. However, it is usually considered to be made up of two major protein groups, glutenin and gliadin. Commercially marketed undenatured or vital wheat gluten is removed from flour by one of several washing processes and usually contains 75% to 80% protein, 6% to 8% fatty-like phospholipids and related compounds, some fiber, residual starch, and a small amount of mineral matter in addition to phosphorous. Modern vacuum drying procedures are generally used in gluten production.

Powdered gluten has found application in the food industry. Particularly, such powder is used to fortify flour for making bread or other yeast-raised products such as rolls and buns, and to increase the protein content, and thereby the strength, of macaroni products. Improved dietary wafers and pharmaceutical tablets have been formulated using 2% to 20% gluten as a binder. Certain charactertic properties of undenatured or vital wheat gluten powder have heretofore tended to limit its further use. Specifically, the maintenance of a dispersion of undenatured or vital wheat gluten powder in essentially neutral aqueous media (between about 4 pH and 7 pH) is difficult since the product in this environment exhibits a pronounced tendency to lump and agglomerate.

Two factors are believed to be involved. First, the material is naturally quite hydrophilic and upon initial wetting tends to hydrate so rapidly that a large proportion becomes encapsulated in small lumps which are difficult to break. Second, individual wetted particles of the product exhibit cohesion, that is, two particles of hydrated gluten which come in contact with each other tend to coalesce and can only be separated by the exertion of considerable force.

The initial dispersing or wetting-out of vital wheat gluten powder can be facilitated by the incorporation therewith of practically any plastic or liquid lipid. These lipid materials tend to partially waterproof the gluten particles and thereby allow controlled wetting, avoiding the formation of initial lumps resulting from hydrated gluten barriers. Such treatment, however, has little or no effect on the tendency of hydrated vital gluten particles to coalesce following dispersion.

In accordance with this invention a method of treating vital wheat gluten powder has been developed which overcomes the tendency toward particle cohesion in neutral aqueous dispersion without denaturing the product. Broadly, this treatment involves the intimate incorporation with or coating of the gluten powder with a small amount of certain specific hydrophilic lipids. Materials found to be satisfactory for treating the gluten are of the non-ionic type and consist of monoglycerides (both of the molecularly distilled type and commercial mixtures of mono, di and triglycerides), edible salts of lactylic esters of fatty acids, polyoxyethylene stearate, stearyl monoglyceridyl citrate, and mixtures of the above. When hydrophilic lipid esters of essentially fully saturated fatty acids containing from 16 to 22 carbon atoms are used, improved results are achieved by admixing in addition a small quantity of a highly water dispersible, edible, surface active agent such as lecithin, hydroxylated lecithin or polyoxyethylene sorbitan monostearate. These latter surface active agents appear to have no inhibiting effect on the coalescing process per se but aid in the initial dispersion of the vital wheat gluten particles. It is theorized that the non-ionic hydrophilic lipids named above remain in initimate contact with the proteinaceous particles providing cohesion control both during and subsequent to hydration.

Other hydrophilic lipids of the same general type have been found to be ineffective for this purpose. Examples of ineffective lipids include monoesters of edible fatty acids with propylene glycol or sorbitol, distilled acetylated monoglycerides and polyglycerol esters of fatty acids. Other than functional results, the distinguishing differences between effective and ineffective hydrophilic lipids are not presently known. However, as a general rule the ineffective lipids appear to be slightly more hydrophilic.

The proportion of lipid material necessary to satisfactorily treat a dry vital wheat gluten powder appears to be dependent not only on the particular lipid used but also on the average particle size of the material undergoing treatment. This would tend to support the hypothesis that the improved results are primarily concerned with a surface phenomenon.

The product produced in accordance with this invention performs in a normal manner when introduced into a dough type system, for example, a typical bread or macaroni dough. The characteristics of the treated product make it ideally suited for use in continuous dough making systems where the powdered gluten may be added to the brew and maintained in a dispersed state until final development of the dough takes place.

In the practice of this invention preparations of dry powdered gluten having a particle size profile similar to bakers' patent flours are generally preferred although it is intended that treatment of any dry powdered gluten material falls within the scope of this invention as illustrated in the following examples.

EXAMPLE A

The gluten treated was from one lot. Analysis indicated that 87% of the powdered gluten would pass a standard U.S. 100 mesh screen. Protein content was 80% of the total.

The lipid ingredients were melted in a jacketed laboratory sigma blade mixer, although coating of the gluten particles can be obtained also with lipid heated so as to be partially in a soft plastic state and partially liquid, or totally in a soft plastic state. Temperature was carefully controlled at 68–70° C. which, in absence of water, will not substantially denature the gluten during the time period involved. The powdered gluten was introduced over a period of 15 minutes with continuous stirring although much shorter periods may be used depending upon the type of mixing equipment and other factors. The resultant homogeneous product was cooled to room temperature while mixing and then passed through a hammer mill.

Several formulations were prepared in accordance with the above method as follows:

*Preparations*

Parts/100 by wt.

(1)

Distilled monostearin (Myverol 18–00, distilled monoglyceride from fully hydrogenated lard, 90% minimum monoester, Distillation Products Industries) _____ 4.0
Hydroxylated lecithin (Centrolene S, Central Soya Co.) _____ 1.0
Powdered gluten _____ 95.0

(2)

Distilled monostearin (Myverol 18–00) _____ 4.0
Distilled lard monoglycerides (Myverol 18–40, distilled monoglyceride from lard, 90% minimum monoester) _____ 1.0
Powdered gluten _____ 95.0

(3)

Distilled lard monoglycerides (Myverol 18–40) ___ 5.0
Powdered gluten _____ 95.0

(4)

40% alpha monoglyceride product from fully hydrogenated fatty acids (SGF 187, Durkee Famous Foods) _____ 5.0
Powdered gluten _____ 95.0

(5)

Calcium stearyl lactylate (Verv CA, commercial grade calcium salt of lactylic esters of fatty acids, C. J. Patterson Co.) _____ 5.0
Powdered gluten _____ 95.0

(6)

40% alpha monoglyceride product from partially hydrogenated fatty acids (SGF 195) _____ 5.0
Powdered gluten _____ 95.0

(7)

Stearyl monoglyceridyl citrate (Seqol 140, commercial grade stearyl monoglyceridyl citrate, Chas. Pfizer & Co.) _____ 5.0
Powdered gluten _____ 95.0

(8)

Distilled lard monoglycerides (Myverol 18–40) ___ 1.0
Powdered gluten _____ 99.0

(9)

Distilled lard monoglycerides (Myverol 18–40) ___ 0.5
Powdered gluten _____ 99.5

(10)

Polyoxyethylene stearate (Myrj 45, commercial grade polyoxyethylene 400 monostearate, Atlas Chemical Co.) _____ 5.0
Powdered gluten _____ 95.0

For comparison, powdered gluten was similarly treated with 5 parts/100 distilled propylene glycol monoester. Untreated powdered gluten was used as control.

The effect of these treatments on the stability of aqueous gluten dispersions was tested by wetting five grams of material with 100 ml. of distilled water at 24° C. while stirring continuously. Following formation, the dispersions were allowed to stand for 120 minutes prior to an evaluation of cohesion control. Results of the various preparations follow:

| Test Material | Dispersibility | Hydration | 120 Minutes Cohesion Control |
|---|---|---|---|
| Preparation #1 | Fair | Fair | Good. |
| Preparation #2 | do | do | Do. |
| Preparation #3 | Instant | Very good | Very Good. |
| Preparation #4 | Poor | Fair | Fair. |
| Preparation #5 | Fair | Good | Very good. |
| Preparation #6 | Good | Fair | Fair. |
| Preparation #7 | Fair | Good | Good. |
| Preparation #8 | Instant | Very good | Do. |
| Preparation #9 | Good | Good | Fair. |
| Preparation #10 | Instant | Very good | Very good. |
| 5% Propylene Glycol Monoester. | Good | Good | None. |
| Untreated Gluten Powder | Fair | Fair | Do. |

The results demonstrate that the practice of this invention (Preparations 1 through 10) provides powdered gluten with the ability to disperse in neutral aqueous media and remain dispersed. The results further demonstrate that cohesion control and initial dispersibility are apparently independent characteristics.

EXAMPLE B

The superior functionality of vital wheat gluten powder treated in accordance with this invention was demonstrated by comparison with vital wheat gluten powder treated with an ineffective material and with untreated vital wheat gluten powder in a laboratory sponge-dough bread make-up. The formula and procedure follows:

FORMULA

| Ingredients | Percent on Flour Basis | |
|---|---|---|
| | Sponge | Dough |
| Patent Flour | 65.0 | 35.0 |
| Water | 67.5 | 67.5 |
| Yeast | 2.5 | |
| Yeast Food | 0.5 | |
| Salt | | 2.0 |
| Sugar (Cerelose) | | 8.0 |
| Non fat Dry Milk Powder | | 3.0 |
| Lard | 2.0 | |

| Procedure: | |
|---|---|
| Sponge Temperature | 79° F |
| Dough Temperature | 80° F |
| Fermentation | 4 hours |
| Floor Time | 45 minutes |
| Overhead Proof | 12 minutes |

Treated vital gluten powder preparations produced as described in Example A were added to the sponge at levels of 1% and 2% based on flour. Results were compared with control tests which contained the same amounts of untreated gluten powder and gluten powder treated with an ineffective hydrophilic lipid in this case, hydroxylated lecithin.

Loaf volume of one pound units was determined 45 minutes after bake-out by the rape seed displacement method. Following 24 hours' storage in air tight containers, the bread was cut and subjectively scored for quality by a method generally similar to that used by the American Institute of Baking, which is a numerical summary of external and internal factors producing a theoretical total of 100 for a perfect loaf.

The specific preparations follow:

*Preparations*

(1)                                                                 Percent

Distilled monostearin (Myverol 18–00) _____ 4
Hydroxylated lecithin (Centrolene S) _____ 1
Powdered gluten _____ 95

(2)

| | Percent |
|---|---|
| Distilled monostearin (Myverol 18-00) | 4 |
| Distilled lard monoglycerides (Myverol 18-40) | 1 |
| Powdered gluten | 95 |

(3)

| | |
|---|---|
| Distilled lard monoglycerides (Myverol 18-40) | 5 |
| Powdered gluten | 95 |

(4)

| | |
|---|---|
| Mono-diglyceride product from fully hydrogenated fatty acids (SGF 187) | 5 |
| Powdered gluten | 95 |

(5)

| | |
|---|---|
| Hydroxylated lecithin (Centrolene S) | 5 |
| Powdered gluten | 95 |

The results of the comparative baking tests follow:

| Test Variables | Usage (percent) | Average Loaf Volume (cc.) | Total Quality Score |
|---|---|---|---|
| Number 1 | 1.0 | 2,600 | 85 |
| Do | 2.0 | 2,525 | 83 |
| Number 2 | 1.0 | 2,575 | 84 |
| Do | 2.0 | 2,650 | 85 |
| Number 3 | 1.0 | 2,600 | 84 |
| Do | 2.0 | 2,600 | 84 |
| Number 4 | 1.0 | 2,550 | 84.5 |
| Do | 2.0 | 2,535 | 83.5 |
| Number 5 | 1.0 | 2,487 | 82 |
| Do | 2.0 | 2,588 | 83 |
| Untreated Gluten | 1.0 | 2,487 | 82 |
| Do | 2.0 | 2,475 | 82 |

It is apparent from the above data that gluten powder treated in accordance with this invention (numbers 1 through 4) markedly improved baking functionality. Note that baking quality was not significantly improved for a powdered gluten treated with the hydrophilic lipid which does not appear to affect the gluten agglomeration phenomenon (number 5).

EXAMPLE C

An evaluation was conducted in a commercial bakery equipped with an Amflo continuous dough making unit manufactured by the American Machine and Foundry Corporation. The gluten powder used in this test was treated with 5.0% distilled lard monoglycerides (Myverol 18-40) corresponding to formulation No. 3 in Example A. The formula used was as follows:

| | |
|---|---|
| Flour | 3,100 lbs. |
| Water | 2,200 lbs. |
| Yeast | 100 lbs. |
| Yeast food | 23 lbs., 4 ozs. |
| Salt | 70 lbs. |
| Non-fat milk solids | 31 lbs. |
| Syrup | 384 lbs. |
| Shortening | 78 lbs. |
| Treated gluten | 62 lbs. |
| Potassium bromate | 120 grams. |
| Potassium iodate | 14 grams. |

The brew contained 20% of the total flour plus the yeast, yeast food, salt, non-fat milk solids, treated gluten and part of the syrup. The remainder of the syrup and flour, the shortening, and the oxidation components were combined in the usual manner at the incorporator. Processing conditions were identical to the normal with the exception that the developer speed was increased by 15 r.p.m. Proofing time was shortened by 5 minutes. Doughs showed good strength out of the proof box.

The bread produced with the treated gluten added to the brew had a significantly improved volume as compared with the control bread made in the normal manner, that is, without added gluten powder. An evaluation using untreated gluten powder could not be conducted because of the coalescing problem. The interior structure of the treated gluten enriched bread was also improved with regard to grain texture, body and chewability. The improvement in crumb strength and resiliency was judged to be markedly superior to the control.

EXAMPLE D

In order to determine the relationship between the particle size of powdered glutens and the amount of treating material necessary to provide the desired cohesion control, the following evaluation was conducted. A spray dried gluten powder containing 75% protein was treated as described in Example A. The gluten was all from one lot. Analysis indicated that 64% would pass through a U.S. 200 mesh screen and 40% would pass through a U.S. 325 mesh screen. For comparison one sample was prepared using the larger particle size gluten of Example A, designated below as "coarse gluten." Several preparations were formulated as follows:

*Preparations*

(1)

| | Parts/100 |
|---|---|
| Distilled monostearin (Myverol 18-00) | 2.5 |
| Distilled lard monoglycerides (Myverol 18-40) | 2.5 |
| Spray dried gluten | 95.0 |

(2)

| | |
|---|---|
| Distilled monostearin (Myverol 18-00) | 2.5 |
| Distilled lard monoglycerides (Myverol 18-40) | 2.5 |
| Coarse gluten | 95.0 |

(3)

| | |
|---|---|
| Distilled monostearin (Myverol 18-00) | 7.5 |
| Distilled lard monoglycerides (Myverol 18-40) | 7.5 |
| Spray dried gluten | 85.0 |

(4)

| | |
|---|---|
| Distilled monostearin (Myverol 18-00) | 12.5 |
| Distilled lard monoglycerides (Myverol 18-40) | 12.5 |
| Spray dried gluten | 75.0 |

(5)

| | |
|---|---|
| Distilled monostearin (Myverol 18-00) | 17.5 |
| Distilled lard monoglycerides (Myverol 18-40) | 17.5 |
| Spray dried gluten | 65.0 |

(6)

| | |
|---|---|
| Distilled monostearin (Myverol 18-00) | 25.0 |
| Distilled lard monoglyceride (Myverol 18-40) | 25.0 |
| Spray dried gluten | 50.0 |

The effect of these treatments on the stability of aqueous gluten powder dispersions was tested as detailed in Example A. Untreated spray dried gluten was dispersed along with the treated samples for comparison.

| Test Material | Dispersibility | Hydration | 120 Min. Cohesion Control |
|---|---|---|---|
| Preparation #1—5% on fine gluten | Poor | Fair | Poor. |
| Preparation #2—5% on coarse gluten | Instant | Very good | Very good. |
| Preparation #3—15% on fine gluten | Good | Fair | Fair. |
| Preparation #4—25% on fine gluten | Very good | Good | Good. |
| Preparation #5—35% on fine gluten | do | do | Do. |
| Preparation #6—50% on fine gluten | Instant | Very good | Very good. |
| Untreated spray dried gluten | Formed dough ball at once | | None. |

These results show that the satisfactory treatment of vital wheat gluten powder in accordance with the present invention involves consideration not only of the particular treating agent, but also the particles size of the gluten powder undergoing treatment.

The laboratory bread make-up procedure outlined in Example B was again employed to demonstrate the superior functionality of gluten powder which has been treated in accordance with this invention. The Preparations 1 through 6 above were compared with untreated glutens of the fine and coarse particle size at a usage level of 1% based on the formula flour. The compiled average results of duplicate bake tests are summarized as follows:

| Test Variables | Average Loaf Vol. (cc.) | Total Quality Score |
| --- | --- | --- |
| Untreated fine gluten | 2,550 | 81 |
| Preparation #1—5% on fine gluten | 2,525 | 81 |
| Preparation #3—15% on fine gluten | 2,637 | 83 |
| Preparation #4—25% on fine gluten | 2,650 | 83 |
| Preparation #5—35% on fine gluten | 2,600 | 82 |
| Preparation #6—50% on fine gluten | 2,600 | 84 |
| Untreated coarse gluten | 2,480 | 82 |
| Preparation #2—5% on coarse gluten | 2,612 | 84 |

These data indicate that the fine particle size vital wheat gluten requires much higher levels of the treating agent than the relatively coarse gluten. The test demonstrates further the relation between improved gluten functionality and cohesion control.

Although specific examples of this invention have been disclosed, it is not to be limited thereto except insofar as such limitations are included in the claims.

What we claim and desire to secure by Letters Patent is:

1. A powdered composition comprising vital wheat gluten particles coated with approximately .5 percent to 50 percent of a non-ionic hydrophilic lipid selected from the class consisting of monoglycerides, salts of lactylic esters of fatty acids, polyoxyethylene stearate, and stearyl monoglyceride citrate, and characterized by stability against particle cohesion in neutral aqueous dispersion.

2. The composition as set forth in claim 1 wherein said lipid is derived from fatty acids containing from 16 to 22 carbon atoms.

3. The composition as set forth in claim 2 wherein said fatty acids are essentially fully saturated and said composition includes in addition in minor portion of a highly dispersible surface active agent.

4. A proteinaceous additive for edible products comprising approximately 50 percent to 95.5 percent of powdered vital wheat gluten coated with approximately .5 percent to 50 percent of monoglycerides.

5. The additive as set forth in claim 4 wherein said monoglycerides are derived from substantially fully saturated fatty acids.

6. The additive as set forth in claim 4 wherein said monoglycerides are approximately 90 percent alpha monoglycerides.

7. A proteinaceous additive for edible products comprising approximately 50 percent to 95.5 percent of powdered vital wheat gluten coated with approximately .5 percent to 50 percent of calcium stearyl lactylate.

8. A proteinaceous additive for edible products comprising approximately 50 percent to 95.5 percent of powdered vital wheat gluten coated with approximately .5 percent to 50 percent of polyoxyethylene stearate.

9. A proteinaceous additive for edible products comprising approximately 50 percent to 95.5 percent of powdered vital wheat gluten coated with approximately .5 percent to 50 percent of stearyl monoglyceridyl citrate.

10. The process of rendering vital wheat gluten particles noncohesive in neutral aqueous dispersion without denaturing comprising mixing a non-ionic hydrophilic lipid selected from the class consisting of monoglycerides, salts of lactylic esters of fatty acids, polyoxyethylene stearate, and stearyl monoglyceridyl citrate with said particles for a time period sufficient to completely coat said particles at an elevated temperature of approximately 68° C. to 70° C. whereat said lipid is at least in a soft plastic state but below gluten denaturing temperature for said period, cooling the mixture to a temperature permitting powdering and powdering the mixture.

11. The process as set forth in claim 13 wherein said powdering step comprises agitating the mixture while cooling the mixture below said elevated temperature.

12. The process as set forth in claim 10 wherein said lipid is melted prior to said mixing.

References Cited

UNITED STATES PATENTS

| | | | |
| --- | --- | --- | --- |
| 2,863,771 | 12/1958 | Ferrara | 99—14 |
| 3,290,152 | 12/1966 | Hartman | 99—17 |

FOREIGN PATENTS

| | | |
| --- | --- | --- |
| 216,286 | 1/1957 | Australia. |

RAYMOND N. JONES, *Primary Examiner.*

UNITED STATES PATENT OFFICE
CERTIFICATE OF CORRECTION

Patent No. 3,362,829  January 9, 1968

Bert W. Landfried et al.

It is hereby certified that error appears in the above numbered patent requiring correction and that the said Letters Patent should read as corrected below.

Column 8, line 31, for the claim reference numeral "13" read -- 10 --.

Signed and sealed this 25th day of February 1969.

(SEAL)
Attest:

Edward M. Fletcher, Jr.
Attesting Officer

EDWARD J. BRENNER
Commissioner of Patents